United States Patent
Choi et al.

(10) Patent No.: US 12,206,880 B2
(45) Date of Patent: Jan. 21, 2025

(54) MULTIVIEW VIEW POSITION SUPPLEMENTARY ENHANCEMENT INFORMATION MESSAGE

(71) Applicant: Tencent America LLC, Palo Alto, CA (US)

(72) Inventors: Byeongdoo Choi, Palo Alto, CA (US); Stephan Wenger, Hillsborough, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 186 days.

(21) Appl. No.: 17/850,581

(22) Filed: Jun. 27, 2022

(65) Prior Publication Data

US 2022/0417543 A1   Dec. 29, 2022

Related U.S. Application Data

(60) Provisional application No. 63/215,944, filed on Jun. 28, 2021.

(51) Int. Cl.
*H04N 19/44* (2014.01)
*H04N 19/169* (2014.01)
(Continued)

(52) U.S. Cl.
CPC .......... *H04N 19/44* (2014.11); *H04N 19/172* (2014.11); *H04N 19/188* (2014.11); *H04N 19/46* (2014.11); *H04N 19/597* (2014.11)

(58) Field of Classification Search
CPC .... H04N 19/172; H04N 19/188; H04N 19/30; H04N 19/44; H04N 19/46; H04N 19/597; H04N 19/70
See application file for complete search history.

(56) References Cited

U.S. PATENT DOCUMENTS

2013/0034170 A1   2/2013   Chen et al.
2014/0003489 A1   1/2014   Hannuksela
(Continued)

FOREIGN PATENT DOCUMENTS

CN     107787585 A     3/2018
WO    2022/068838 A1   4/2022

OTHER PUBLICATIONS

Boyce et al. Title: Additional SEI messages for VSEI (Draft 3) Joint Video Experts Team (JVET) of ITU-T SG 16 WP 3 and ISO/IEC JTC 1/SC 29 22nd Meeting, by teleconference, Apr. 20-28, 2021, Document: JVET-V2006-v1 (Year: 2021).*

(Continued)

*Primary Examiner* — William C Vaughn, Jr.
*Assistant Examiner* — Naod W Belai
(74) *Attorney, Agent, or Firm* — ArentFox Schiff LLP

(57) ABSTRACT

Aspects of the disclosure provide a method, an apparatus, and non-transitory computer-readable storage medium for video decoding. The apparatus includes processing circuitry. The processing circuitry can decode, from a bitstream, pictures associated with views of respective layers in a coded video sequence (CVS). The processing circuitry is configured to determine, based on a first supplemental enhancement information (SEI) message and a second SEI message, positions of the views to be displayed in one dimension. The first SEI message includes scalability dimension information (SDI) and the second SEI message includes multiview view position (MVP) information. The processing circuitry is configured to display the decoded pictures based on the positions of the views in the one dimension.

20 Claims, 17 Drawing Sheets

(51) Int. Cl.
  *H04N 19/172* (2014.01)
  *H04N 19/46* (2014.01)
  *H04N 19/597* (2014.01)

(56) References Cited

U.S. PATENT DOCUMENTS

| | | |
|---|---|---|
| 2014/0140414 A1 | 5/2014 | Deshpande |
| 2014/0192151 A1 | 7/2014 | Wang et al. |
| 2016/0381385 A1 | 12/2016 | Ugur |
| 2020/0195946 A1 | 6/2020 | Choi et al. |

OTHER PUBLICATIONS

Joshi et al., Title: High Efficiency Video Coding (HEVC) Screen Content Coding: Draft 3, Joint Collaborative Team on Video Coding (JCT-VC) ) of ITU-T SG 16 WP 3 and ISO/IEC JTC 1/SC 29/WG 11 Document: JCTVC-T1005 20th Meeting: Geneva, CH, Feb. 10-Feb. 17, 2015 (Year: 2015).*

Boyce J & Wang Y, Additional SEI messages for VSEI (Draft 3), Joint Video Experts Team (JVET) of ITU-T SG 16 WP 3 and ISO/IEC JTC 1/SC 29, 22nd Meeting, by teleconference, Apr. 20-28, 2021, Document: IVET-V2006-v1, pp. 1-27.

Joshi R et al: "HEVC Screen Content Coding Draft Text 3" , 20. JCT-VC Meeting; Feb. 10, 2015-Feb. 18, 2015; Geneva; (Joint Collaborative Team On Video Coding of ISO/IEC JTC1/SC29/WG11 and ITU-T SG.16 ), No. JCTVC-T1005, Apr. 5, 2015, pp. 1-563.

"Working Draft 2 of ISO/IEC 23002-7 Amd. 1 Additional SEI messages", 133. MPEG Meeting; Jan. 11, 2021-Jan. 15, 2021; Online; (Motion Picture Expert Group or ISO/IEC JTC1/SC29/WG11), No. n20069 Apr. 24, 2021, pp. 1-21.

Wang Y et al: "AHG9: On the scalability dimension information SEI message", 22. JVET Meeting; Apr. 20, 2021-Apr. 28, 2021; Teleconference; (The Joint Video Exploration Team of ISO/IEC JTC1/SC29/WG11 and ITU-T SG.16 ), No. JVET-V0063 ; m56460 Apr. 13, 2021, pp. 1-4.

"Text of ISO/IEC 23002-7:2021 CDAM 1 Additional SEI messages", 134. MPEG Meeting; Apr. 26, 2021-Apr. 30, 2021; Online; (Motion Picture Expert Group or ISO/IEC JTC1/SC29/WG11), No. n20232 May 14, 2021, pp. 1-31.

Choi B et al: "AHG9: Multiview view position SEI message", 23. JVET Meeting; Jul. 7, 2021-Jul. 16, 2021; Teleconference; (The Joint Video Exploration Team of ISO/IEC JTC1/SC29/WG11 and ITU-T SG.16 ), No. JVET-W0078 ; m57193, Jun. 30, 2021, pp. 1-3.

Supplementary European Search Report issued Sep. 15, 2023 in Application No. 22800556.7, pp. 1-14.

Bross et al., "Versatile Video Coding Editorial Refinements on Draft 10", Joint Video Experts Team (JVET) of ITU-T SG 16 WP 3 and ISO/IEC JTC 1/SC 29, 20th Meeting, by teleconference, 2020, Document: JVET-T2001-v2, 511 pages.

Choi, et al., "AHG9: Comments on multiview-related SEI messages in VSEI" 135. MPEG Meeting; Jul. 12, 2021-Jul. 16, 2021; Online; (Motion Picture Expert Group or Iso/Iec JTC1/SC29/WG11), No. m57192, Jun. 30 2021.

Extended European Search Report received for European Patent Application No. 22801688.7, mailed on Aug. 10, 2023, 9 pages.

International Search Report and Written Opinion dated Sep. 29, 2022 in Application No. PCT/US2022/073237, 7 pages.

Office Action received for Japanese Patent Application No. 2023-519995, mailed on Mar. 19, 2024, 12 pages (6 pages of English Translation and 6 pages of Original Document).

Text of ISO/IEC FDIS 23002-7:202X Versatile supplemental enhancement information messages for coded video bitstreams (2nd edition), 137. MPEG Meeting; Jan. 17, 2022-Jan. 21, 2022; Online; (Motion Picture Expert Group or ISO/IEC JTC1/SC29/WG11), Apr. 15, 2022.

Vetro et al., "Overview of the Stereo and Multiview Video Coding Extensions of the H.264/MPEG-4 AVG Standard", IEEE, Apr. 2011, retrieved on [Aug. 25, 2022]. Retrieved from the Internet <URL: https:l/ieeexplore.ieee.org/stamp/stamp.jsp?tp=&arnumber=5705534> entire document.

Wang, Y.K. et al., "AHG9: On the MAI, DRI, and AC I SEI messages and their interactions with the SDI SEI message", Joint Video Experts Team (JVET) of ITU-T SG 16 WP 3 and ISO/IEC JTC 1/SC 29, JVE T-V0064-v1,22nd Meeting, by teleconference, 2021, pp. 1-8.

Office Action issued in Chinese Patent Application No. 202280006616.2 with English translation, mailed on Jun. 27, 2024, 17 pages.

* cited by examiner

| three_dimensional_reference_displays_info( payloadSize ) { | Descriptor |
|---|---|
| prec_ref_display_width | ue(v) |
| ref_viewing_distance_flag | u(1) |
| if( ref_viewing_distance_flag ) | |
|    prec_ref_viewing_dist | ue(v) |
| num_views_minus1 | ue(v) |
| num_ref_displays_minus1 | ue(v) |
| for( i = 0; i <= num_ref_displays_minus1; i++ ) { | |
|    left_view_id[ i ] | ue(v) |
|    right_view_id[ i ] | ue(v) |
|    exponent_ref_display_width[ i ] | u(6) |
|    mantissa_ref_display_width[ i ] | u(v) |
|    if( ref_viewing_distance_flag ) { | |
|       exponent_ref_viewing_distance[ i ] | u(6) |
|       mantissa_ref_viewing_distance[ i ] | u(v) |
|    } | |
|    additional_shift_present_flag[ i ] | u(1) |
|    if( additional_shift_present_flag[ i ] ) | |
|       num_sample_shift_plus512[ i ] | u(10) |
| } | |
| three_dimensional_reference_displays_extension_flag | u(1) |
| } | |

FIG. 12

MULTIVIEW VIEW POSITION SUPPLEMENTARY ENHANCEMENT INFORMATION MESSAGE

INCORPORATION BY REFERENCE

This present disclosure claims the benefit of priority to U.S. Provisional Application No. 63/215,944, "Techniques for Multiview View Position SEI Message for Coded Video Stream" filed on Jun. 28, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode, from a bitstream, pictures associated with views of respective layers in a coded video sequence (CVS). The processing circuitry can determine, based on a first supplemental enhancement information (SEI) message and a second SEI message, positions of the views to be displayed in one dimension. The first SEI message includes scalability dimension information (SDI) and the second SEI message includes multiview view position (MVP) information. The processing circuitry can display the decoded pictures based on the positions of the views in the one dimension.

In an embodiment, for each of the views of the respective layers of the CVS, the processing circuitry can determine a view identifier of the respective view based on the first SEI message. The processing circuitry can determine the position of the respective view to be displayed in the one dimension based on a view position variable in the second SEI message and the determined view identifier.

In an embodiment, the processing circuitry derives a first value indicating a number of the views from the first SEI message. The processing circuitry can obtain a second value associated with the number of the views from the second SEI message. The second value is different from the first value. The processing circuitry can compare one plus the second value with the first value in a conformance check.

In an embodiment, the second SEI message is associated with an intra random access point (TRAP) access unit of the CVS.

In an embodiment, the positions of the views are applied to access units in the CVS.

In an example, the second SEI message is included in the CVS based on the first SEI message being included in the CVS. The determining and the displaying are performed based on the first SEI message and the second SEI message being included in the CVS.

In an embodiment, the CVS includes a third SEI message including 3D reference display information. The 3D reference display information indicates a view identifier of a left view, a view identifier of a right view, and a reference display width of a reference display. The processing circuitry can derive a first value indicating a number of the views from the first SEI message. The processing circuitry can obtain a third value associated with the number of the views from the third SEI message. The third value is different from the first value. The processing circuitry can compare one plus the third value with the first value in a conformance check.

In an example, the third SEI message indicates a number of reference displays signaled in the third SEI message. A maximum value of the number of reference displays is based on the third value associated with the number of the views in the third SEI message.

In an example, the first SEI message is an SDI SEI message and the second SEI message is an MVP SEI message.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 12 shows a syntax example in an SEI message for indicating 3D reference display information according to an embodiment of the disclosure.

DETAILED DESCRIPTION OF EMBODIMENTS

Figure 1A:
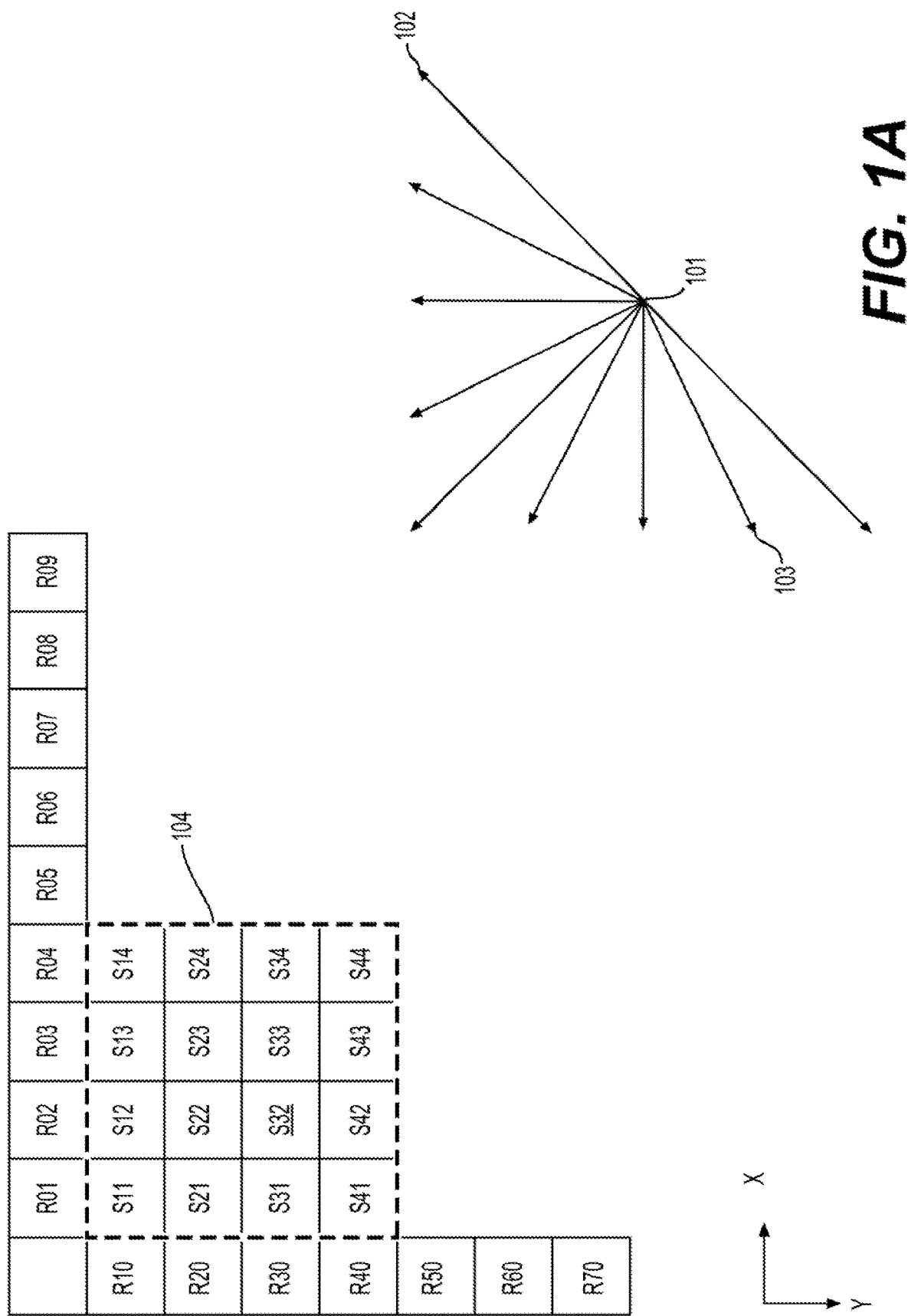
FIG. 1A is a schematic illustration of an exemplary subset of intra prediction modes.
Figure 1B:
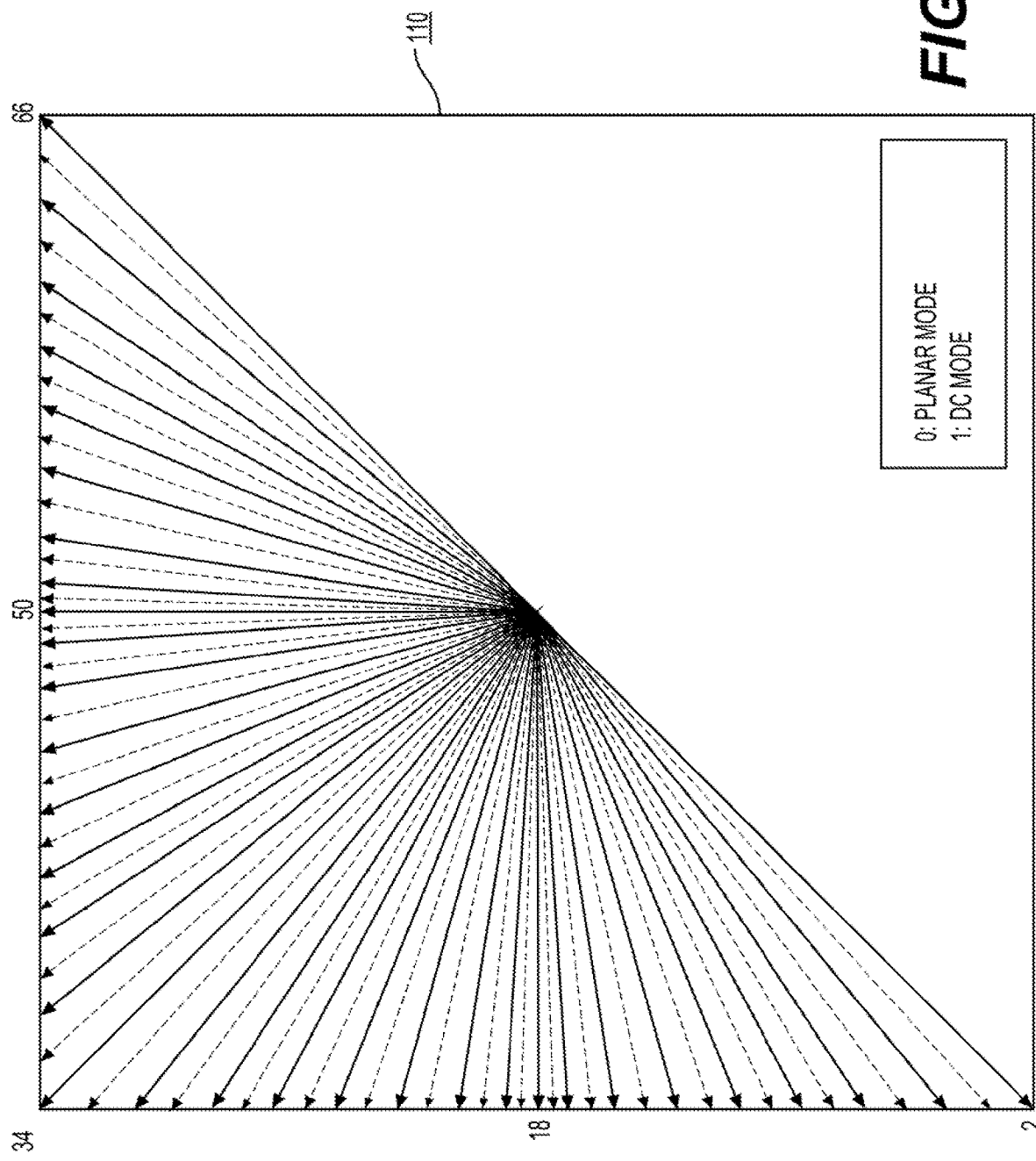
FIG. 1B is an illustration of exemplary intra prediction directions.
Figure 2:
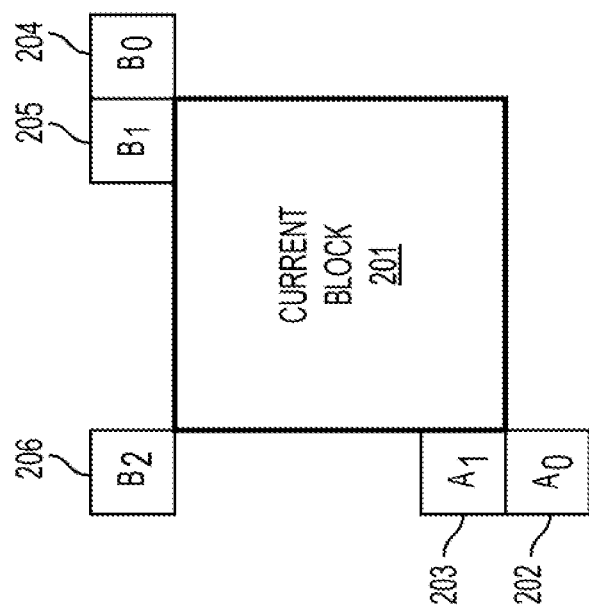
FIG. 2 shows a current block (201) and surrounding samples in accordance with an embodiment.
Figure 3:
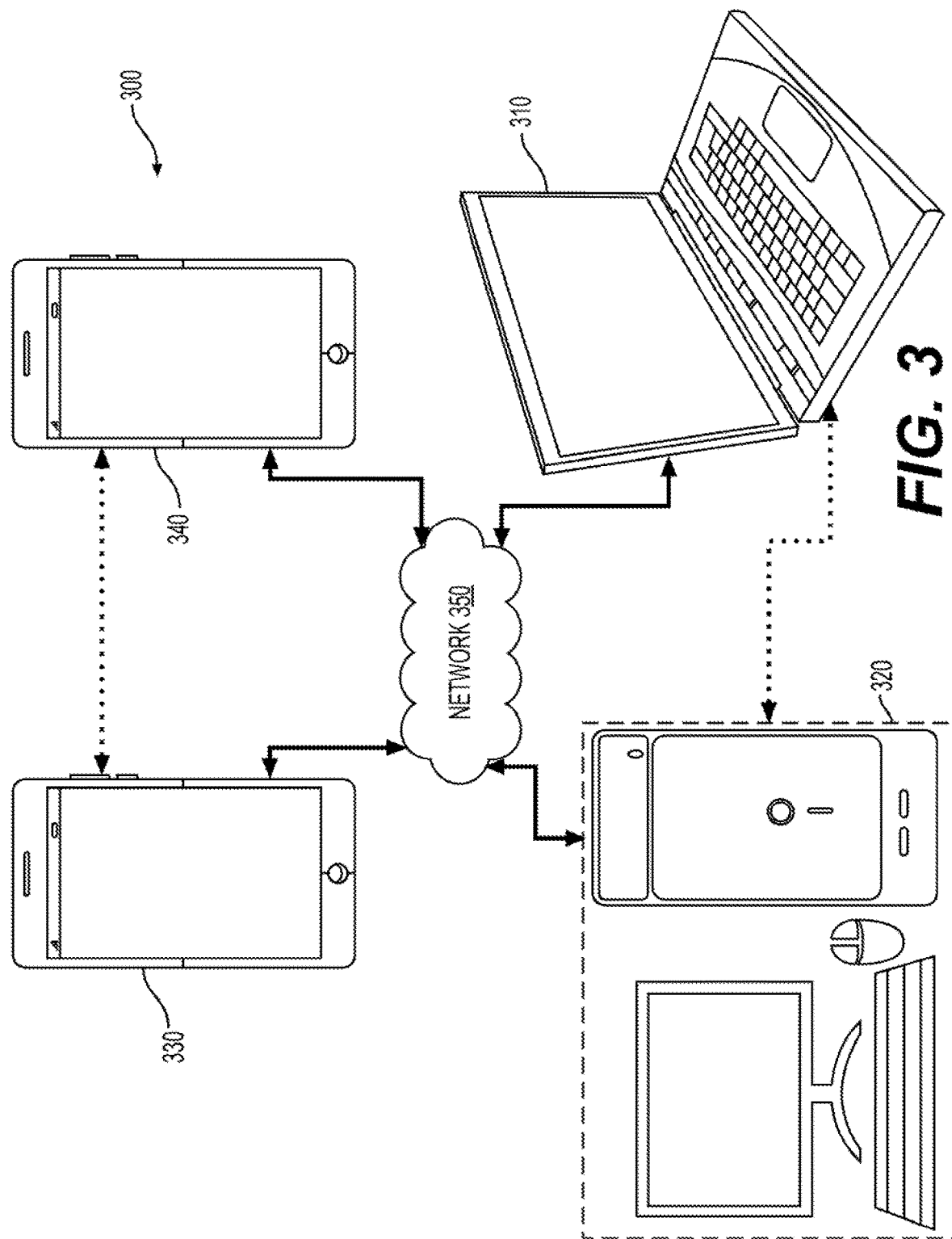
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
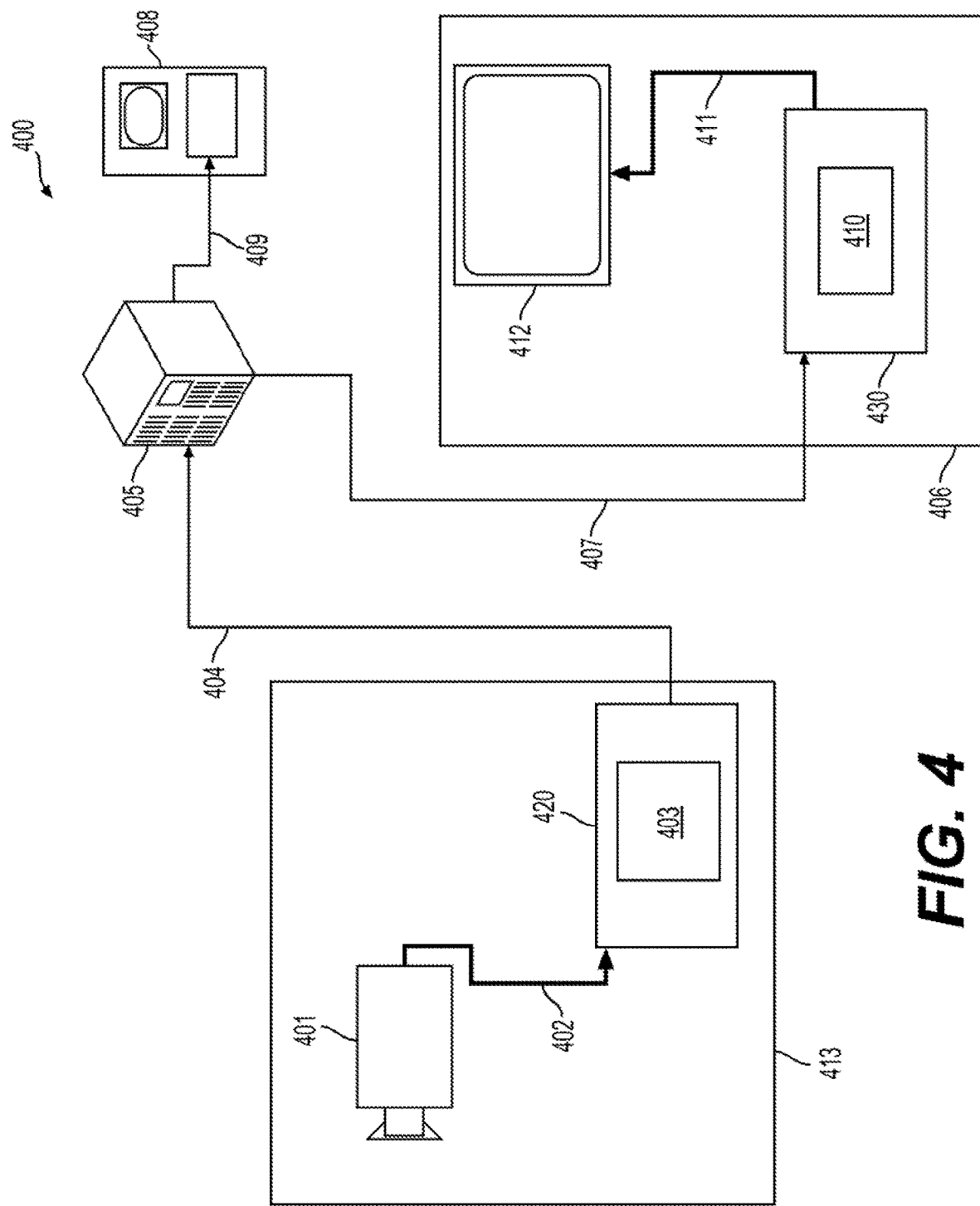
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
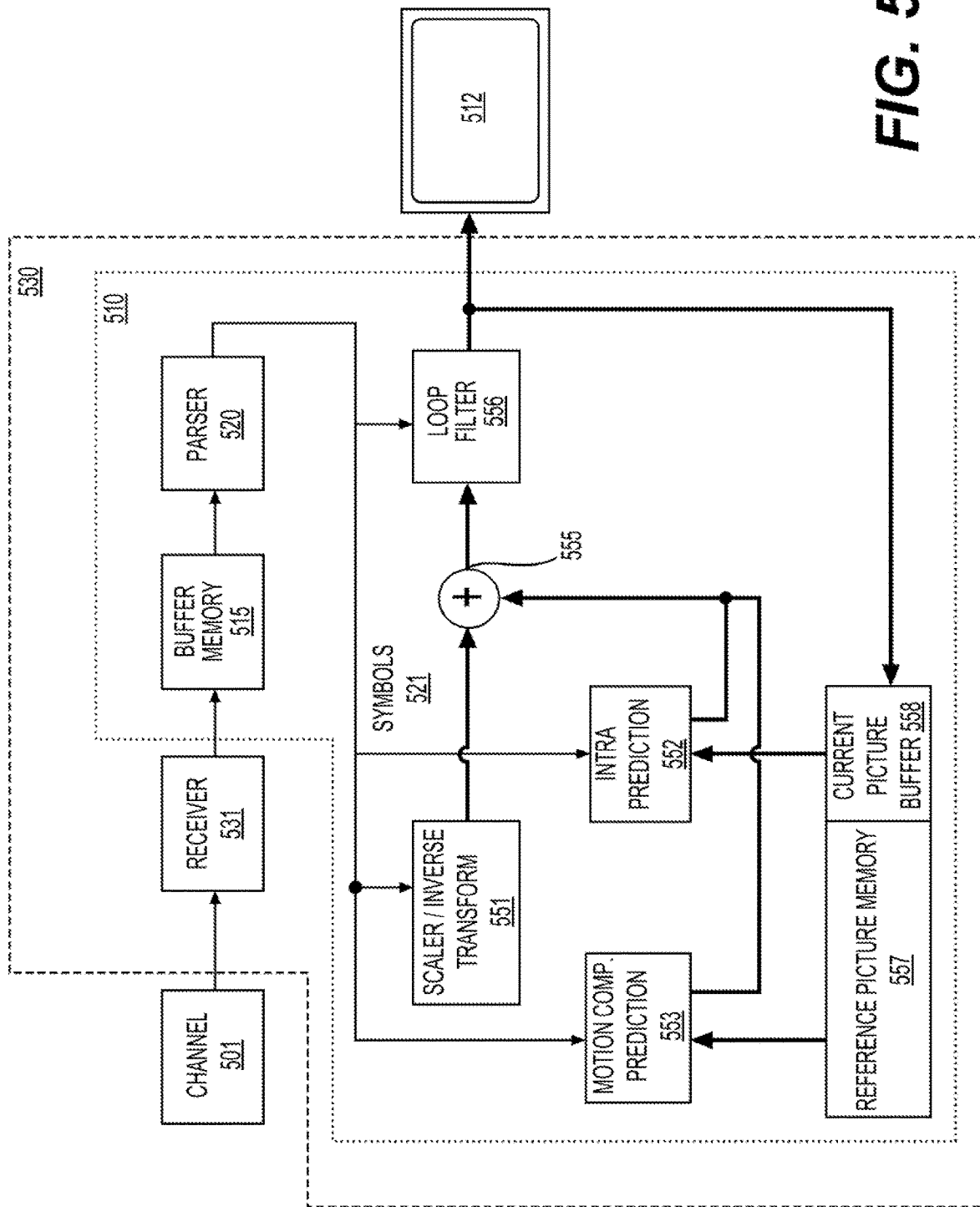
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
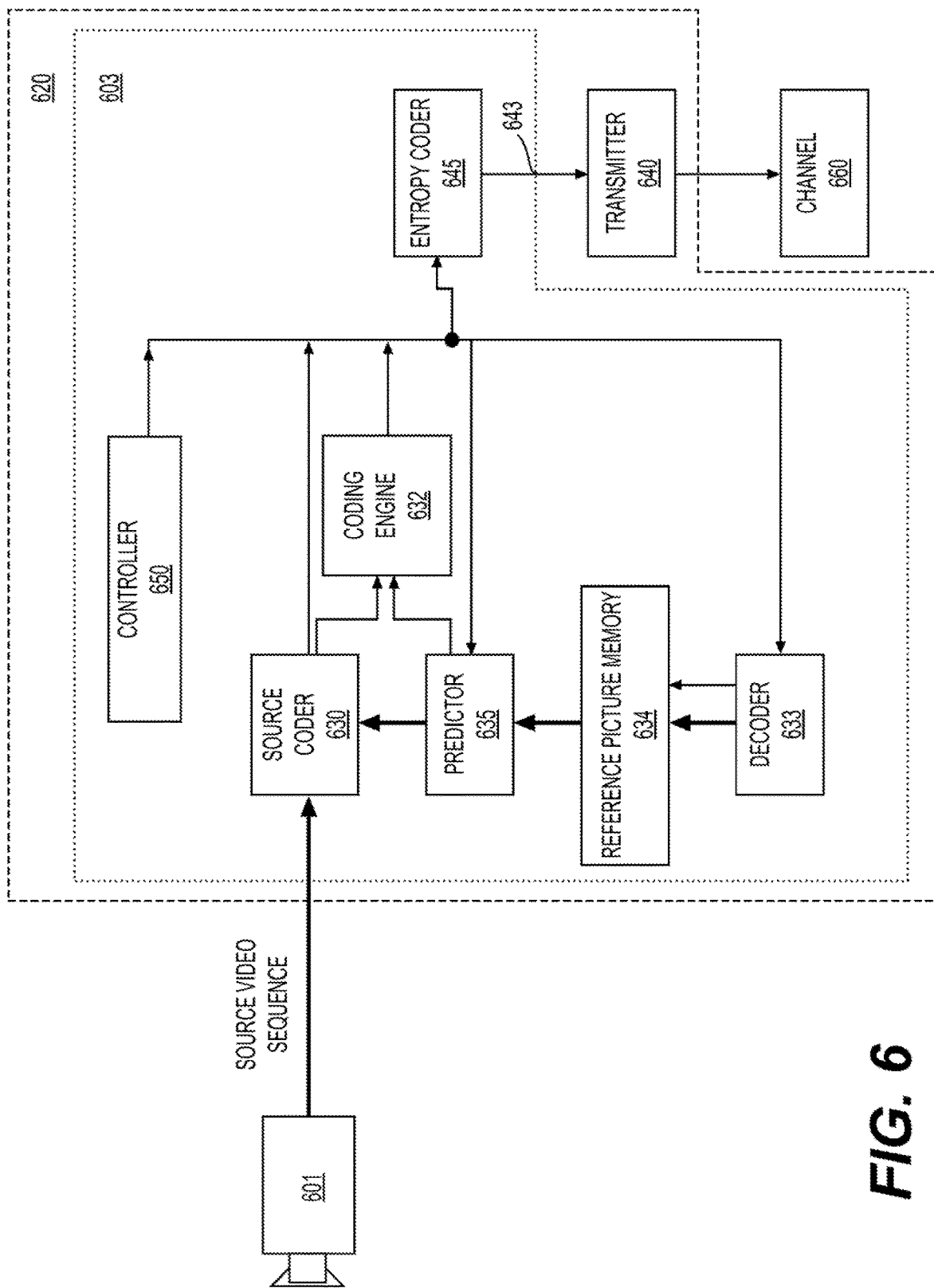
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
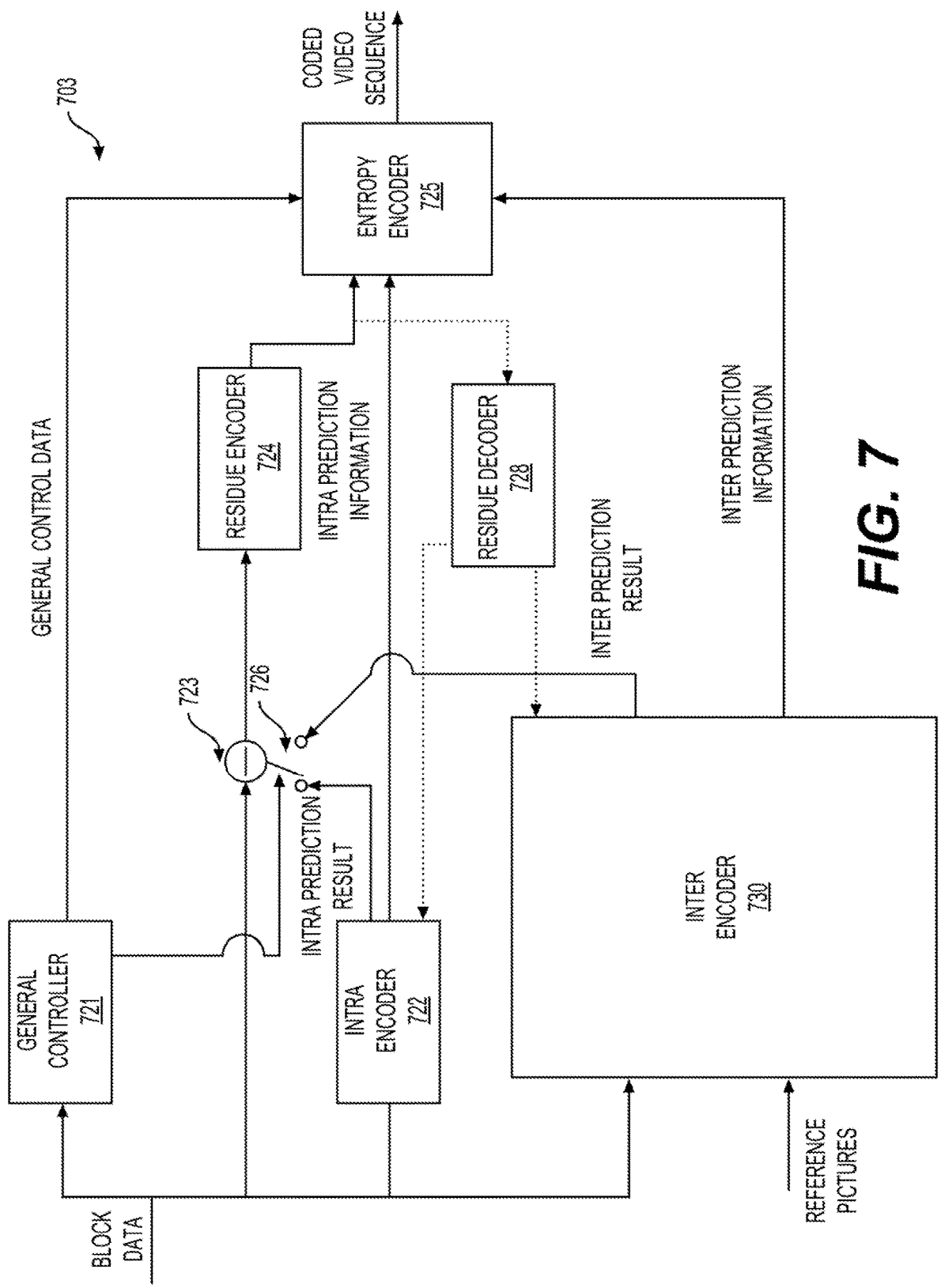
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
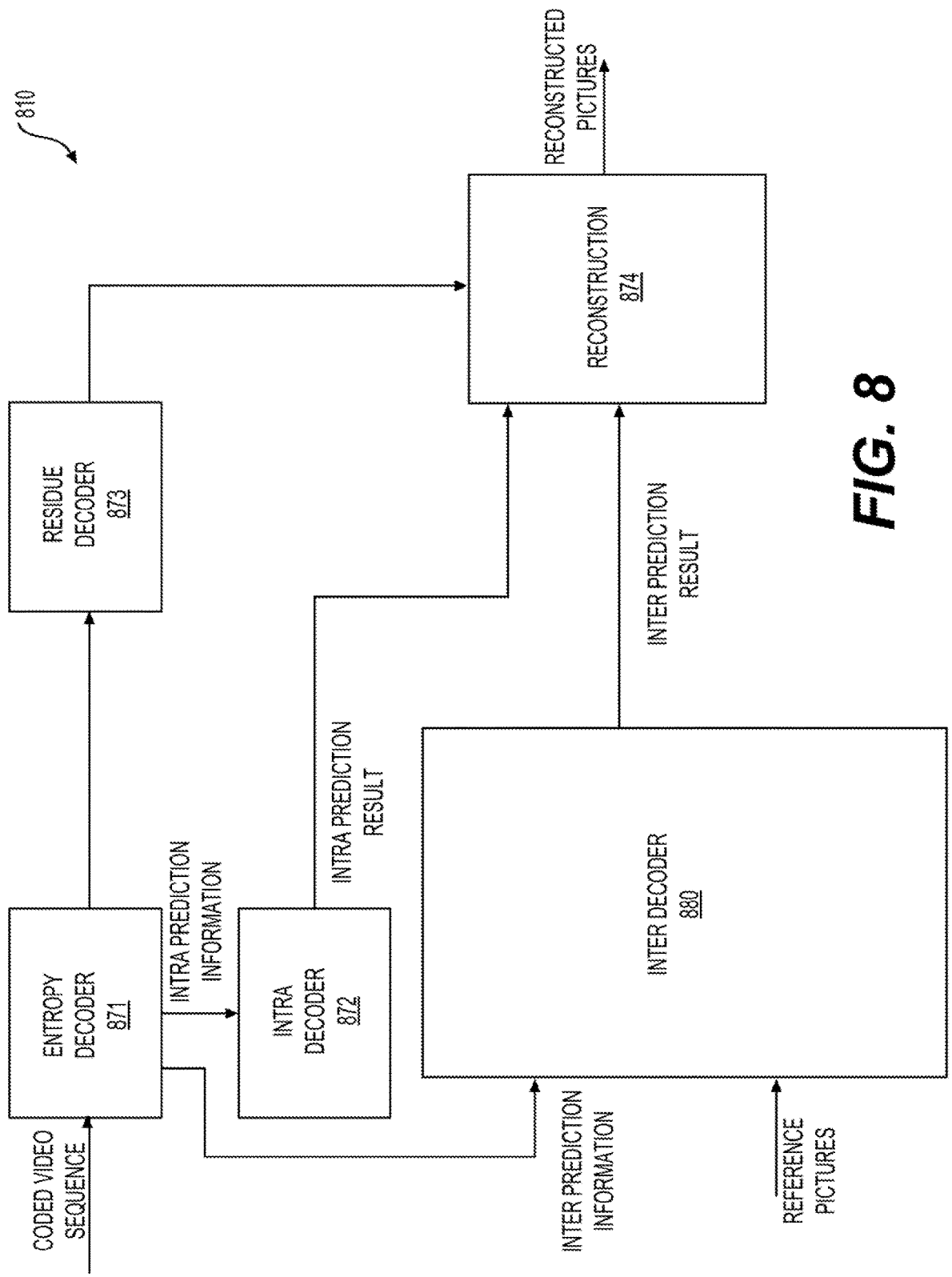
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be)

to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

According to an embodiment of the disclosure, a bitstream can include one or more coded video sequences (CVSs). A CVS can be independently coded from other CVSs. Each CVS can include one or more layers, and each layer can be a representation of a video with a specific quality (e.g., a spatial resolution), or a representation of a certain component interpretation property, e.g., as a depth map, a transparency map, or a perspective view. In a temporal dimension, each CVS can include one or more access units (AUs). Each AU can include one or more pictures of different layers that correspond to a same time instance. A coded layer video sequence (CLVS) is a layer-wise CVS that can include a sequence of picture units in the same layer. If a bitstream has multiple layers, a CVS in the bitstream can have one or more CLVSs for each layer.

In an embodiment, a CVS includes a sequence of AUs where the sequence of AUs includes, in a decoding order, an intra random access point (IRAP) AU, followed by zero or more AUs that are not IRAP AUs. In an example, the zero or more AUs includes all subsequent AUs up to but not including any subsequent AU that is an IRAP AU. In an example, a CLVS includes a sequence of pictures and the associated non-video coding layer (VCL) network abstraction layer (NAL) units of a base layer of a CVS.

Aspects of the disclosure include a multiview view position supplemental enhancement information (SEI) message for a coded video stream.

According to some aspects of the disclosure, video can be categorized into single view videos and multiview videos. For example, a single view video (e.g., a monoscopic video) is a two-dimensional medium that provides viewers a single view of a scene. A multiview video can provide multiple viewpoints of a scene, and can provide viewers the sensation of realism. In an example, a 3D video can provide two views, such as a left view and a right view corresponding to a human viewer. The two views may be displayed (presented) simultaneously or near simultaneously using different polarizations of light, and a viewer may wear polarized glasses such that each of the viewer's eyes receives a respective one of the views.

In another example, a display device, such as an auto-stereoscopic display device is configured to generate different pictures depending on positions of a viewer's eyes, and do not require glasses for viewing. The display device can be referred to as a glassless 3D display.

A multiview video can be created by capturing a scene using multiple cameras simultaneously, where the multiple cameras are properly located so that each camera captures the scene from one viewpoint. The multiple cameras can capture multiple video sequences corresponding to multiple viewpoints. To provide more views, more cameras can be used to generate a multiview video with a large number of video sequences associated with the views. The multi-view video may require a large storage space to store and/or a high bandwidth to transmit. Multiview video coding techniques have been developed in the field to reduce the required storage space or the transmission bandwidth.

To improve efficiency of multiview video coding, the similarities between views are exploited. In some embodiments, one of the views that is referred to as a base view, is encoded like a monoscopic video. For example, during the encoding of the base view, the intra(picture) and/or temporal inter(picture) predictions are used. The base view may be decoded using a monoscopic decoder (e.g., a monoscopic decoder) that performs intra(picture) prediction and the inter(picture) prediction. Other views beside the base view in the multiview video can be referred to as dependent views. To code the dependent views, in addition to intra(picture) and inter(picture) predictions, the inter-view prediction with disparity compensation may be used. In an example, in an inter-view prediction, a current block in a dependent view is predicted using a reference block of samples from a picture of another view in the same time instance. The location of the reference block is indicated out by a disparity vector. The inter-view prediction is similar to the inter(picture) prediction except that the motion vectors are replaced by the disparity vectors, and the temporal reference pictures are replaced by the reference pictures from other views.

According to some aspects of the disclosure, multiview coding can employ a multi-layer approach. The multi-layer approach can multiplex different coded (e.g., HEVC-coded) representations of video sequences, called layers, into one bitstream. The layers can depend on each other. Dependencies can be used by inter-layer prediction to achieve increased compression performance by exploiting similarities among different layers. A layer can represent texture, depth or other auxiliary information of a scene related to a particular camera perspective. In some examples, all layers belonging to the same camera perspective are denoted as a view; and layers carrying the same type of information (e.g., texture or depth) are called components in the scope of multiview video.

According to an aspect of the disclosure, the multiview video coding can include high level syntax (HLS) (e.g., higher than a slice level) additions with existing single layer decoding cores. In some examples, the multiview view coding does not change the syntax or decoding process required for (e.g., HEVC) single-layer coding below the slice level. Re-use of existing implementations without major changes for building multiview video decoders can be allowed. For example, a multiview video decoder can be implemented based on the video decoder (510) or the video decoder (810).

In some examples, all pictures associated with the same capturing or display time instance are contained in an AU and have the same picture order count (POC). The multiview video coding can allow inter-view prediction that performs prediction from pictures in the same AU. For example, the decoded pictures from other views can be inserted into one or both of the reference picture lists of a current picture. Further, in some examples, the motion vectors may be actual temporal motion vectors when related to temporal reference pictures of the same view, or may be disparity vectors when related to inter-view reference pictures. Block-level motion compensation modules (e.g., block level encoding software or hardware, block level decoding software or hardware) can be used which operate the same way regardless of whether a motion vector is a temporal motion vector or a disparity vector.

According to an aspect of the disclosure, the multiview video coding can code pictures of different views at a display time instance in an order (e.g., a decoding order) that is not necessarily in association with a corresponding display position order or display order.

Figure 9:
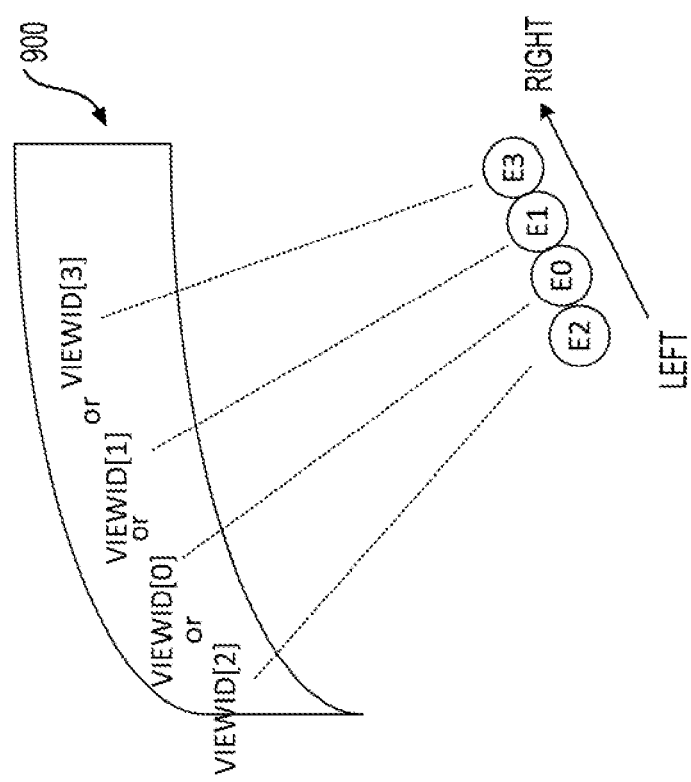
FIG. 9 shows a diagram of auto-stereoscopic display according to an embodiment of the disclosure.

FIG. 9 shows a diagram of auto-stereoscopic display (900) in some examples. The auto-stereoscopic display (900) can display pictures of different views at different positions. In an example, the auto-stereoscopic display (900) displays pictures of different views in response to detected eye positions of an observer. In the FIG. 9 example, the eye positions of the observer can be detected in one dimension, such as between a leftmost position and a rightmost position. For example, when the observer's eye position is at E0, the auto-stereoscopic display (900) displays pictures of a view with a view identifier ViewId[0]; when the observer's eye position is at E1, the auto-stereoscopic display (900) displays pictures of a view with a view identifier ViewId[1]; when the observer's eye position is at E2, the auto-stereoscopic display (900) displays pictures of a view with a view identifier ViewId[2]; and when the observer's eye position is at E3, the auto-stereoscopic display (900) displays pictures of a view with a view identifier ViewId[3]. The order of observer's eye position from left to right is E2, E0, E1 and E3.

Figure 10A:
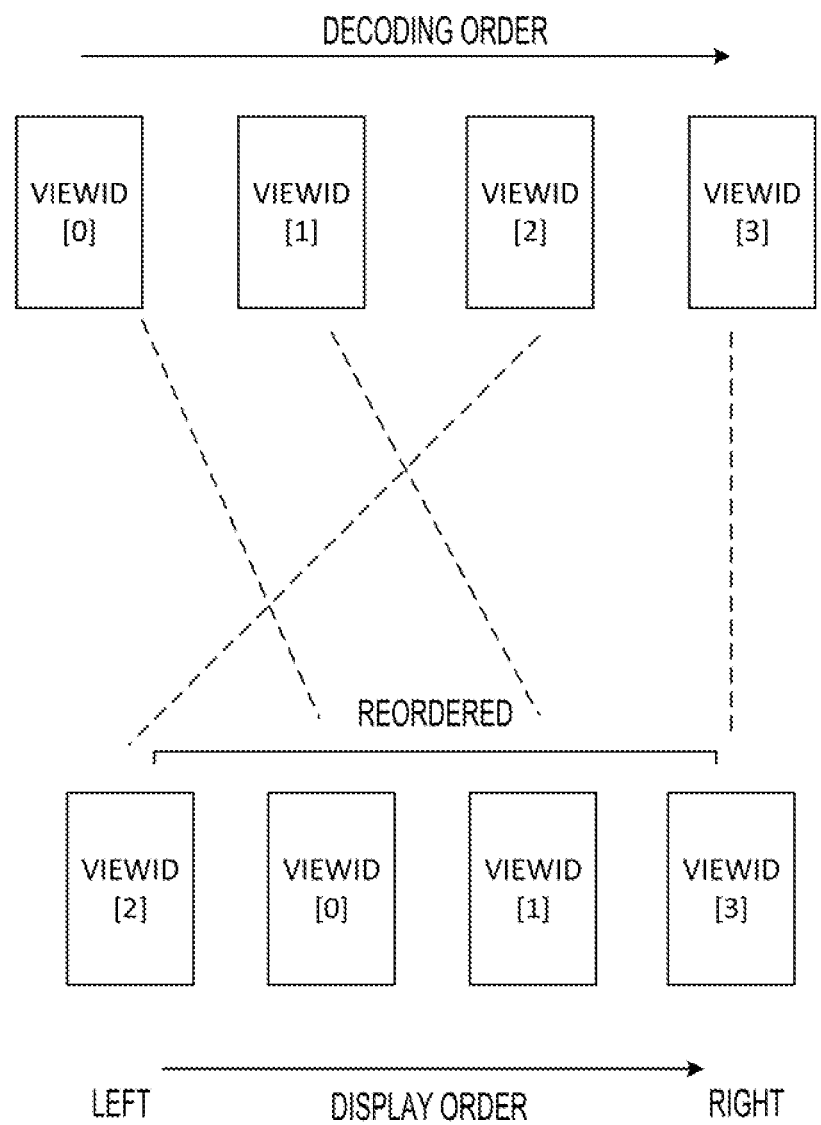
FIG. 10A shows an example of reordering pictures based on multiview view positions according to an embodiment of the disclosure.

FIG. 10A shows an example of reordering pictures based on multiview view positions according to an embodiment of the disclosure. When multiple views or different views are presented, view position information that indicates a display order along one dimension (e.g., a display from left to right along a horizontal axis) can be signaled for an intended user experience. The display order can be indicated by multiview view positions of the multiple views or corresponding pictures. In an example, the multiple views include a first view to be displayed at a first multiview view position and a second view to be displayed at a second multiview view position. First pictures of the first view can be displayed at the first multiview view position. Second pictures of the second view can be displayed at the second multiview view position.

In some examples, the pictures P0-P3 correspond to multiple views (e.g., ViewId[0]-ViewId[3]), respectively. The pictures P0-P3 are associated with a same capturing time instance or a same display time instance. The pictures P0-P3 can be coded (encoded or decoded) in a coding order (e.g., an encoding order or a decoding order) that may be determined based on certain coding requirements, such as rate distortion optimization, and the like. The decoding order can be indicated based on the pictures P0-P3 or based on the corresponding views ViewId[0]-ViewId[3]. Referring to FIG. 10A, an example of the decoding order is P0 of the view ViewId[0], P1 of the view ViewId[1], P2 of the view ViewId[2], and P3 of the view ViewId[3] where P0 of the view ViewId[0] is decoded prior to decoding P1-P3 of ViewId[1]-ViewId[3], respectively. Alternatively, the decoding order is ViewId[0], ViewId[1], ViewId[2], and ViewId [3].

In an embodiment, the decoding order is different from a displaying order of the pictures (e.g., P0-P3) or the corresponding views (e.g., ViewId[0]-ViewId[3]). According to an embodiment of the disclosure, the decoded pictures (e.g., P0-P3) or the corresponding views (e.g., ViewId[0]-ViewId [3]) can be re-ordered according to the display order. The display order can be signaled for the intended user experience. Referring to FIG. 10A, the display order is ViewId[2], ViewId[0], ViewId[1], and ViewId[3] where the view ViewId[2] is displayed as the leftmost view, and the view ViewId[3] is displayed as the rightmost view. The corresponding display order based on the pictures is P2, P0, P1, and P3. The views (and the decoded pictures) are re-ordered according to the display order.

In some examples, an AU includes coded information of pictures of different views associated with the same capturing or display time instance. For example, an AU includes coded information of the picture P0 of the view ViewId[0], the picture P1 of the view ViewId[1], the picture P2 of the view ViewId[2], and the picture P3 of the view ViewId[3]. The coding order of the pictures P0-P3 does not necessarily follow the order of the observer's eye position.

Figures 10B, 10C:
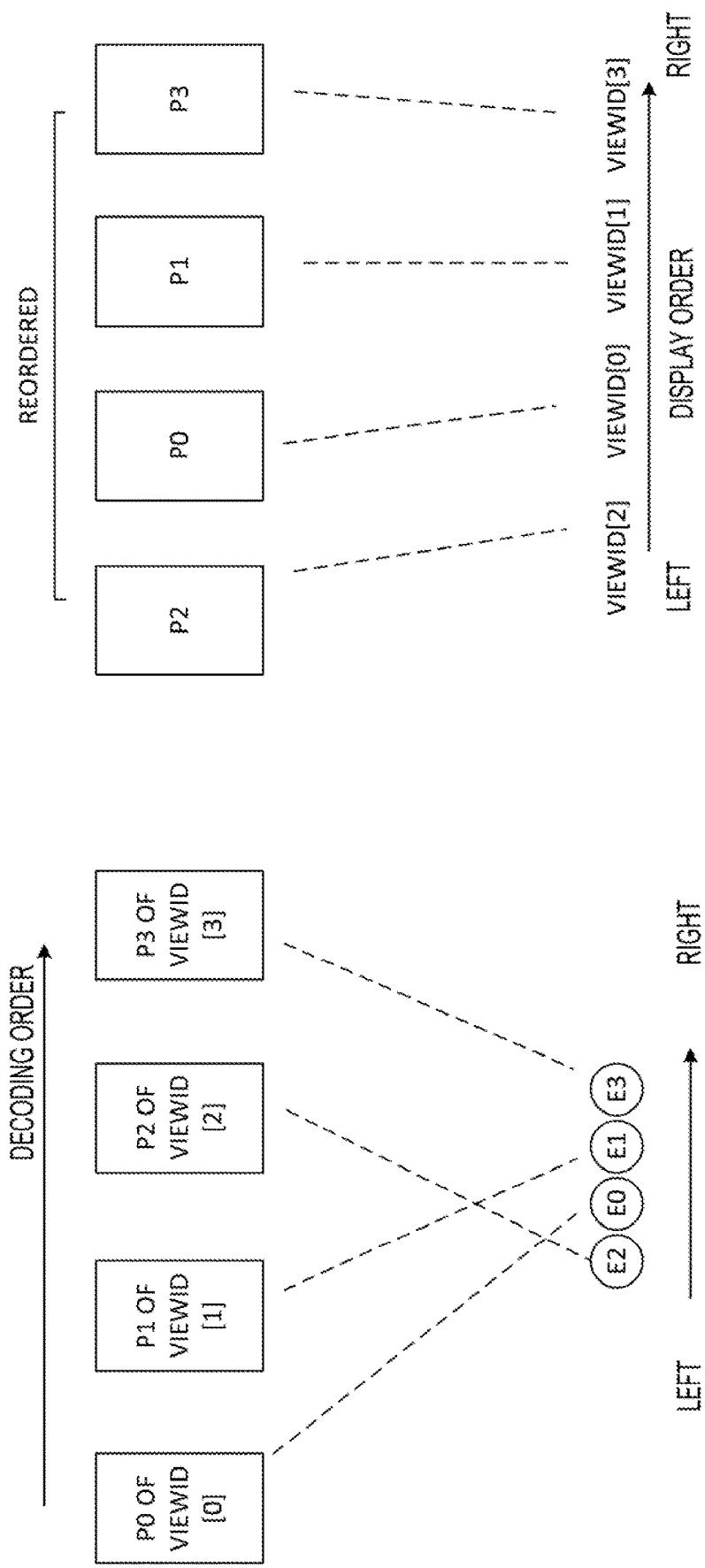
FIGS. 10B-C show an example of reordering pictures based on multiview view positions according to an embodiment of the disclosure.

FIGS. 10B-C show an example of reordering pictures according to multiview view positions in an example. FIG. 10B shows pictures in an AU that is decoded according to a decoding order. In the FIG. 10B example, the pictures P0-P3 in an AU are decoded in an order of P0, P1, P2 and P3. Because the order of observer's eye positions from left to right is E2, E0, E1 and E3. The decoded picture order does not correspond to the order of the observer's eye positions from left to right.

In some examples, the decoded pictures can be re-ordered according to a display order that is signaled for example for the intended user experience. In an example, the display order is associated with the order of the observer's eye positions, such as from left to right.

FIG. 10C shows decoded pictures in an AU that are re-ordered according to a display order in some examples. For example, the display order is associated with the order of the observer's eye positions from left to right.

According to some aspects of the disclosure, supplemental enhancement information (SEI) messages can be included in an encoded bitstream, for example, to assist in the decoding and/or display of the encoded bitstream, or for another purpose. SEI message(s) can include information that is not necessary for decoding, such as decoding samples of coded pictures from VCL NAL units. SEI message(s) can be optional for constructing luma or chroma samples by a decoding process. In some examples, SEI messages is not required for reconstructing luma or chroma samples during the decoding process. Additionally, decoders that conform to a video coding standard that supports SEI messages are not required to process SEI messages to be conforming. For some coding standards, some SEI message information may be required to check bitstream conformance or for outputting timing decoder conformance. SEI message(s) may be optionally processed by conforming decoders for output order conformance to a certain standard (e.g., HEVC 265 or VVC). In an embodiment, SEI message(s) are present in the bitstream.

SEI messages can contain various types of data that indicate the timing of the video pictures or describe various properties of the coded video or how the various properties can be used or enhanced. In some examples, SEI messages do not affect the core decoding process, but can indicate how the video is recommended to be post-processed or displayed.

SEI messages can be used to provide additional information about an encoded bitstream, which can be used to change the presentation of the bitstream once the bitstream is decoded, or to provide information to a decoder. For example, SEI messages have been used to provide frame packing information (e.g., describing the manner in which video data is arranged in a video frame), content descriptions (e.g., to indicate that the encoded bitstream is, for example, 360-degree video), and color information (e.g., color gamut and/or color range), among other things.

In some examples, an SEI message can be used to signal to a decoder that the encoded bitstream includes 360-degree video. The decoder can use the above information to render the video data for a 360-degree presentation. Alternatively, if the decoder is not capable of rendering 360-degree video, the decoder can use the above information to not render the video data.

According to an embodiment of the disclosure, a first SEI message can indicate scalability dimension information (SDI) of a multiview video. For example, the first SEI message (e.g., an SDI SEI message) may include number and types of scalability dimensions, such as information indicating the number of views and the like for the multiview video. According to an embodiment of the disclosure, a view identifier (ID) (e.g., denoted as ViewID) of an i-th layer in a current CVS can be signaled in the first SEI message (e.g., the SDI SEI message). In an example, a syntax element sdi_view_id_val[i] specifies a value of the view ID (e.g., ViewID) of the i-th layer in the current CVS. A length (e.g., a number of bits used to represent the syntax element sdi_view_id_val[i]) of the syntax element sdi_view_id_val[i] can be indicated by a syntax element sdi_view_id_len_minus1. The unit of the length can be bits. In an example, a value of the length of the syntax element sdi_view_id_val[i] is equal to a value of the syntax element sdi_view_id_len_minus1 plus 1.

According to an aspect of the disclosure, the display order can be signaled using a second SEI message, such as an SEI message indicating multiview view position (MVP) information. In some related examples, the second SEI message can include information indicating view positions in one dimension (e.g., along a horizontal axis). For example, the second SEI message can include the view positions in one dimension that correspond to observer eye positions. The second SEI message (e.g., an MVP SEI message) can be useful for indicating the relative view positions along a horizontal axis of 3D rendering view, e.g., for a glassless 3D display.

Figure 11:
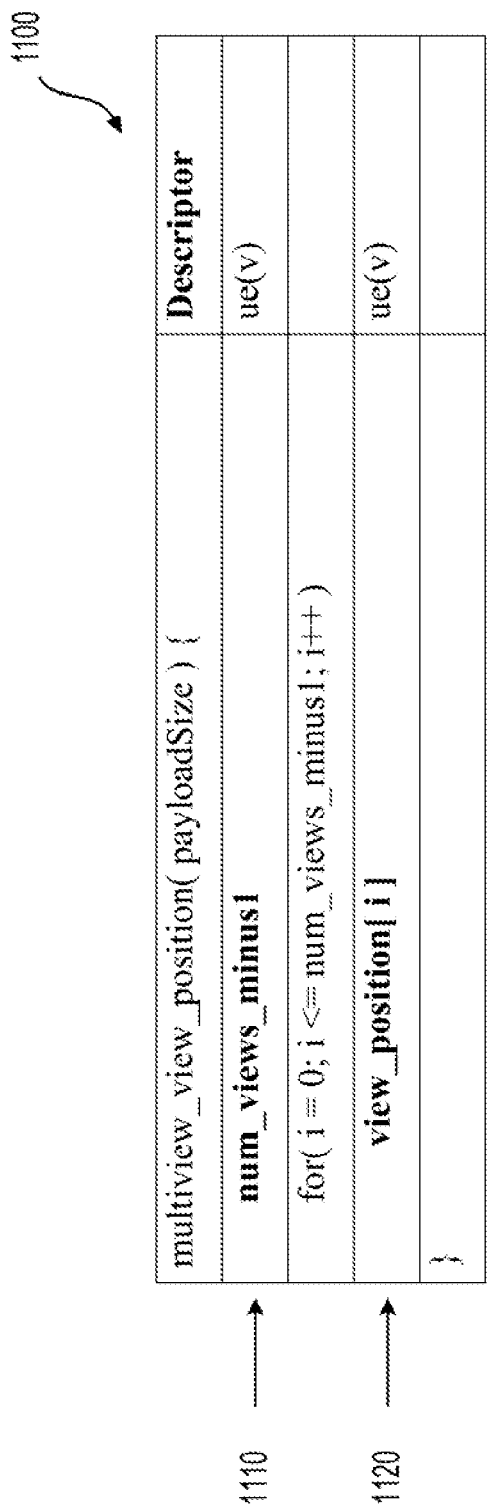
FIG. 11 shows a syntax example in a supplemental enhancement information (SEI) message for indicating view positions for a multiview video according to an embodiment of the disclosure.

FIG. 11 shows a syntax example (1100) in the second SEI message (e.g., the MVP SEI message) for indicating view positions for a multiview video. For example, the MVP SEI message specifies relative view positions of views within a CVS along a horizontal axis of a 3D rendering view. When the multiple views are present, the MVP information in the MVP SEI message indicating the display order from left to right can be signaled for the intended user experience.

The MVP SEI message can be associated with an IRAP AU of the CVS. MVP information signaled in the MVP SEI message can be applied to the entire CVS. In some examples, the MVP SEI message can signal the number of views, and then signal positions of the views respectively.

In the FIG. 11 example, a parameter denoted by num_views_minus1 can be signaled by the MVP SEI message as shown by (1110). The parameter num_views_minus1 is indicative of the number of views (e.g., a parameter denoted as NumViews), for example in an access unit. For example, the number of views is equal to a sum of 1 and the value of the parameter num_views_minus1.

An order (e.g., a display order) of the views in the one dimension, such as the positions of the views in the display order can be signaled in the MVP SEI message using a parameter view_positions[i]. The value i is an integer from 0 to num_views_minus1, as shown by (1120) in FIG. 11.

The parameter view_position[i] can indicate the order (e.g., the display order) of the view with a view identifier (ID) ViewId equal to a value of the syntax element sdi_view_id_val[i] in the first SEI message among the views (e.g., all the views) from left to right for the purpose of display. The value of the order for the left-most view can be equal to 0 and the value of the order can increase by 1 for a next view from left to right. The value of the parameter view_position[i] can be in a range of 0 to 62, inclusive.

In an example, to signal the view positions for the example in FIG. 10A, "3" can be signaled as the parameter num_views_minus1 to indicate that the number of the views is 4. "1" is signaled as the view_position[0] for the ViewId being 0, "2" is signaled as the view_position[1] for the ViewId being 1, "0" is signaled as the view_position[2] for the ViewId being 2, and "3" is signaled as the view_position[3] for the ViewId being 3, where "0" is the leftmost view, and "3" is the rightmost view in position from left to right. Then, when views ViewId[0]-ViewId[3] are decoded from an access unit, the view ViewId[0] has the view_position[0], the view ViewId[1] has the view_position[1], the view ViewId[2] has the view_position[2], and the view ViewId[3] has the view_position[3]. The views ViewId[0]-ViewId[3] can be re-ordered according to corresponding view positions view_position[0] to view_position[3] to obtain the display order in FIG. 10A.

According to an embodiment of the disclosure, pictures associated with views of respective layers in a CVS can be decoded from a bitstream. Based on the first SEI message and the second SEI message, positions of the views to be displayed in one dimension (e.g., along a horizontal axis) can be determined. The decoded pictures can be displayed based on the positions of the views in the one dimension (e.g., along the horizontal axis). For each of the views of the respective layers of the CVS, a view ID (e.g., ViewId[i]) of the respective view can be determined based on the first SEI message. The position of the respective view to be displayed in the one dimension (e.g., along the horizontal axis) can be determined based on a view position variable (e.g., view_position[i]) in the second SEI message and the determined view identifier (e.g., ViewId[i]).

Referring to FIGS. 10A and 11, in an example, the value of the syntax element num_view_minus1 is 3, and the number of the views to be displayed is 3 plus 1, which is 4. The integer i of the syntax element sdi_view_id_val[i] in the first SEI message (e.g., the SDI SEI message) is 0, 1, 2, or 3, corresponding to the syntax element sdi_view_id_val[0], sdi_view_id_val[1], sdi_view_id_val[2], or sdi_view_id_val[3], respectively. In an example, sdi_view_id_val[0] is 0, sdi_view_id_val[1] is 1, sdi_view_id_val[2] is 2, and sdi_view_id_val[3] is 3. Based on the second SEI message (e.g., the MVP SEI message), the syntax element view_position[i] indicates the display order or a view position with the ViewId equal to the syntax element sdi_view_id_val[i] in the first SEI message. The syntax element view_position[0] indicates the view position with the ViewId equal to sdi_view_id_val[0] (e.g., 0), and thus the view ViewId[0] is at the view_position[0] (e.g., 1). The syntax element view_position[1] indicates the view position with the ViewId equal to sdi_view_id_val[1] (e.g., 1), and thus the view ViewId[1] is at the view_position[1] (e.g., 2). The syntax element view_position[2] indicates the view position with the ViewId equal to sdi_view_id_val[2] (e.g., 2), and thus the view ViewId[2] is at the view_position [2] (e.g., 0). The syntax element view_position[3] indicates the view position with the ViewId equal to sdi_view_id_val [3] (e.g., 3), and thus the view ViewId[3] is at the view_position[3] (e.g., 3).

According to an aspect of the disclosure, the MVP SEI message includes one or more parameters that can have a semantic dependency on information in the SDI SEI message. For example, a syntax element num_views_minus1 in the MVP SEI message has a semantic dependency on the value of a parameter NumViews that is derived from the SDI SEI message. In an example, a first value (e.g., the value of the parameter NumViews) that indicates the number of the views is derived from the SDI SEI message. A second value (e.g., a value of the syntax element num_views_minus1) associated with the number of the views is obtained from the MVP SEI message. The second value can be different from the first value. A number "1" plus the second value can be compared with the first value in a conformance check. Referring to FIG. 10A, the first value is 4 and the second value is 3. The second value (e.g., 3) plus 1 is equal to the first value (e.g., 4), and satisfies the conformance check. Thus, the MVP SEI message may subject to constraints in association with the SDI SEI message.

In an example, when a CVS does not contain an SDI SEI message, the CVS does not contain an MVP SEI message. In some examples, an MVP SEI message is not present when an SDI SEI message is not present. In an example, the MVP SEI message is included in the CVS based on the SDI SEI message is included in the CVS.

In an embodiment, a third SEI message indicates 3D reference display information is signaled. FIG. 12 shows a syntax example (1200) in the third SEI message for indicating 3D reference display information according to an embodiment of the disclosure.

The third SEI message (e.g., a 3D reference displays information SEI message shown in FIG. 12) can include reference displays information about reference display width(s), reference viewing distance(s), and information about corresponding reference stereo pair(s), e.g., the pair(s) of views to be displayed for left and right eyes of a viewer on the reference display at a reference viewing distance. The reference displays information can enable a view renderer to generate a proper stereo pair for a target screen width and a viewing distance. Values of the reference display width(s) and reference viewing distance(s) can be signaled in units of centimeters. The reference pair of view specified in the third SEI message can be used to extract or infer parameters related to a distance between camera centers in the reference stereo pair, which can be used for generation of views for the target display. For multi-view displays, the reference stereo pair can correspond to a pair of views that can be simultaneously observed by the left and right eyes of the viewer.

When present, the third SEI message can be associated with an AU (e.g., an IRAP AU or a non-IRAP AU), when all AUs that follow the AU in the decoding order follow the AU in an output order. The third SEI message can be applied to the current AU and all the AUs which follow the AU in both the output order and the decoding order until but not including a next TRAP AU or a next AU containing another 3D reference displays information SEI message.

The third SEI message (e.g., the 3D reference displays information SEI message) can specify display parameters for which a 3D video sequence is optimized and the corresponding reference parameters. Each reference display (e.g., a reference display width and optionally a corresponding viewing distance) can be associated with one reference pair of views by signaling the respective view identifier (e.g., denoted as ViewId). The difference between the values of ViewId is referred to as a baseline distance (e.g., a distance between centers of the cameras used to obtain the 3D video sequence).

The following equations can be used for determining the baseline distance and a horizontal shift for a display at the receiver when the ratio between a viewing distance of the receiver and the reference viewing distance is the same as the ratio between a screen width of the receiver and the reference screen width.

$$\text{baseline}[i] = \text{refBaseline}[i] \times (\text{refDisplayWidth}[i] \div \text{displayWidth}) \quad \text{Eq. 1}$$

$$\text{shift}[i] = \text{refShift}[i] * (\text{refDisplayWidth}[i] \div \text{displayWidth}) \quad \text{Eq. 2}$$

where refBaseline[i] is equal to (right_view_id[i]−left_view_id[i]) signaled in the third SEI message. Other parameters related to the view generation may be obtained determined by using a similar equation.

$$\text{parameter}[i] = \text{refParameter}[i] * (\text{refDisplayWidth}[i] \div \text{displayWidth}) \quad \text{Eq. 3}$$

refParameter[i] is a parameter related to view generation that corresponds to the reference pair of views signaled by left_view_id[i] and right_view_id[i]. In the above equations, the width of the visible part of the display used for showing the video sequence can be understood under "display width". The above equations can be used for determining the pair of views and a horizontal shift or other view synthesis parameters when the viewing distance is not scaled proportionally to the screen width compared to the reference display parameters where the effect of applying the above equations is to keep the perceived depth in the same proportion to the viewing distance as in the reference setup.

When the view synthesis related parameters that correspond to the reference stereo pair change from one AU to another AU, the view synthesis related parameters can be scaled with the same scaling factor as the parameters in the AU that the third SEI message is associated with. The above equation can be applied to obtain the parameters for a following AU, where the refParameter[i] is the parameter related to the reference stereo pair associated the following access unit.

The horizontal shift for the display of the receiver can be modified by scaling it with the same factor as that used to scale the baseline distance (or other view synthesis parameters).

When a CVS does not contain the first SEI message (e.g., an SDI SEI message), the CVS does not contain the third SEI message (e.g., a 3D reference displays information SEI message).

Referring to FIG. 12, a syntax element prec_ref_display_width can specify the exponent of the maximum allowable truncation error for refDisplayWidth[i] as given by (2−prec_ref_display width). The value of the syntax element prec_ref_display_width can be in the range of 0 to 31, inclusive.

A syntax element ref_viewing_distance_flag being equal to 1 can indicate the presence of a reference viewing distance. The syntax element ref_viewing_distance_flag being equal to 0 indicates that the reference viewing distance is not present.

A syntax element prec_ref_viewing_dist can specify the exponent of the maximum allowable truncation error for refViewingDist[i] as given by (2−prec_ref_viewing_dist). The value of prec_ref_viewing_dist can be in the range of 0 to 31, inclusive.

A syntax element num_views_minus1 plus 1 can be equal to NumViews that is derived from the first SEI message (e.g., the SDI SEI message) for the CVS. According to an aspect of the disclosure, the third SEI message includes one or more parameters that have a semantic dependency on information in the first SEI message (e.g., the SDI SEI message). In an example, the first value (e.g., NumViews) that indicates the number of the views is derived from the first SEI message. A third value (e.g., num_views_minus1) associated with the number of the views from the third SEI message is obtained. The third value can be different from the first value. One (e.g., a value "1") plus the third value can be compared with the first value in a conformance check.

A syntax element num_ref_displays_minus1 plus 1 can specify the number of reference displays that are signaled in the third SEI message. A maximum value of the number of reference displays can be based on the third value (e.g., num_views_minus1) associated with the number of the views in the third SEI message. The value of num_ref_displays_minus1 can be in the range of 0 to num_views_minus 1, inclusive.

A syntax element left_view_id[i] can indicate the ViewId of the left view of a stereo pair corresponding to the i-th reference display.

A syntax element right_view_id[i] can indicate the ViewId of the right view of a stereo-pair corresponding to the i-th reference display.

A syntax element exponent_ref_display width[i] can specify the exponent part of the reference display width of the i-th reference display. The value of exponent_ref_display_width[i] can be in the range of 0 to 62, inclusive. The value 63 is reserved for future use by ITU-T|ISO/IEC. Decoders can treat the value 63 as indicating an unspecified reference display width.

A syntax element mantissa_ref_display_width[i] can specify the mantissa part of the reference display width of the i-th reference display. The variable refDispWidthBits specifying the number of bits of the mantissa_ref_display_width[i] syntax element can be derived as follows:

If a syntax element exponent ref_display_width[i] is equal to 0, refDispWidthBits is set equal to Max(0, prec_ref_display_width−30).

Otherwise (0<exponent_ref_display_width[i]<63), refDispWidthBits is set equal to Max(0, exponent_ref_display_width[i]+prec_ref_display_width−31).

A syntax element exponent_ref_viewing_distance[i] can specify the exponent part of the reference viewing distance of the i-th reference display. The value of exponent_ref_viewing_distance[i] can be in the range of 0 to 62, inclusive. The value 63 is reserved for future use by ITU-T|ISO/IEC. Decoders can treat the value 63 as indicating an unspecified reference display width.

A syntax element mantissa_ref_viewing_distance[i] can specify the mantissa part of the reference viewing distance of the i-th reference display. The variable refViewDistBits specifying the number of bits of the mantissa_ref_viewing_distance[i] syntax element is derived as follows:

If a syntax element exponent_ref_viewing_distance[i] is equal to 0, the refViewDistBits is set equal to Max(0, prec_ref_viewing_distance−30).

Otherwise (0<exponent_ref_viewing_distance[i]<63), refViewDistBits is set equal to Max(0, exponent_ref_viewing_distance[i]+prec_ref_viewing_distance−31).

Table 1 shows an exemplary association between camera parameter variables and syntax elements in the third SEI message.

TABLE 1

Association between camera parameter variables and syntax elements

| x | refDisplayWidth[ i ] | refViewingDistance[ i ] |
|---|---|---|
| e | exponent_ref_display_width[ i ] | exponent_ref_viewing_distance[ i ] |
| n | mantissa_ref_display_width[ i ] | mantissa_ref_viewing_distance[ i ] |
| v | refDispWidthBits | refViewDistBits |

The variables in the x row of Table 1 are derived from the respective variables or values in the e, n and v rows of Table 1 as follows:

If e is not equal to 0, the following applies:

$$x = 2^{(e-31)} \times (1+n \div 2^v)$$

Otherwise (e.g., e is equal to 0), the following applies:

$$x = 2^{-(30+v)} \times n$$

Referring back to FIG. 12, a syntax element additional_shift_present_flag[i] being equal to 1 can indicate that the information about additional horizontal shift of the left and right views for the i-th reference display is present in the third SEI message. The syntax element additional_shift_present_flag[i] being equal to 0 can indicate that the information about additional horizontal shift of the left and right views for the i-th reference display is not present in the third SEI message.

A syntax element num_sample_shift_plus512[i] can indicate the recommended additional horizontal shift for a stereo pair corresponding to the i-th reference baseline and the i-th reference display.

If (num_sample_shift_plus512[i]−512) is less than 0, the left view of the stereo pair corresponding to the i-th reference baseline and the i-th reference display can be shifted in the left direction by (512−num_sample_shift_plus512[i]) samples with respect to the right view of the stereo pair.

Otherwise, if the syntax element num_sample_shift_plus512[i] is equal to 512, shifting may not be applied.

Otherwise, (num_sample_shift_plus512[i]−512) is greater than 0, the left view in the stereo pair corresponding to the i-th reference baseline and the i-th reference display can be shifted in the right direction by (512−num_sample_shift_plus512[i]) samples with respect to the right view of the stereo pair.

The value of num_sample_shift_plus512[i] can be in the range of 0 to 1023, inclusive.

In an embodiment, shifting the left view in the left (or right) direction by x samples with respect to the right view can be performed by the following two-step processing: 1) shift the left view by x/2 samples in the left (or right) direction and shift the right view by x/2 samples in the right (or left) direction; 2) fill the left and right image margins of x/2 samples in width in both the left and right views in background color.

The following pseudo code shows an example of the shifting processing in the case of shifting the left view in the left direction by x samples with respect to the right view:

```
for(i = x/2; i < width - x/2; i++)
    for( j = 0; j < height; j++) {
        leftView[j][i] = leftView[j][i + x/2]
        rightView[j][width - 1 - i] = rightView[j][width - 1 - i - x/2]
    }
for(i = 0; i < x / 2; i++)
    for(j = 0; j < height; j++) {
        leftView[j][width - 1 - i] = leftView[j][i] = backgroundColour
        rightView[j][width - 1 - i] = rightView[j][i] = backgroundColour
    }
```

The following pseudo code shows an example of the shifting processing in the case of shifting the left view in the right direction by x samples with respect to the right view:

```
for(i = x/2; i < width - x / 2; i++)
   for(j = 0; j < height; j++) {
      leftView[j][width - 1 - i] = leftView[j][width - 1 - i - x/2]
      rightView[j][i] = rightView[j][i + x/2]
   }
for(i = 0; i < x / 2; i++)
   for(j = 0; j < height; j++) {
      leftView[j][width - 1 - i] = leftView[j][i] = backgroundColour
      rightView[j][width - 1 - i] = rightView[j][i] = backgroundColour
   }
```

The variable backgroundColour may take different values in different systems, for example black or gray.

A syntax element three_dimensional_reference_displays_extension_flag being equal to 0 can indicate that no additional data follows within the third SEI message (e.g., the 3D reference displays SEI message). In an example, the value of three_dimensional_reference_displays_extension_flag is equal to 0 in bitstreams conforming to some standards. The value of 1 for three_dimensional_reference_displays_extension_flag is reserved for future use by ITU-T|ISO/IEC. Decoders can ignore all data that follows the value of 1 for three_dimensional_reference_displays_extension_flag in the third SEI message (e.g., a 3D reference displays SEI message).

Figure 13:
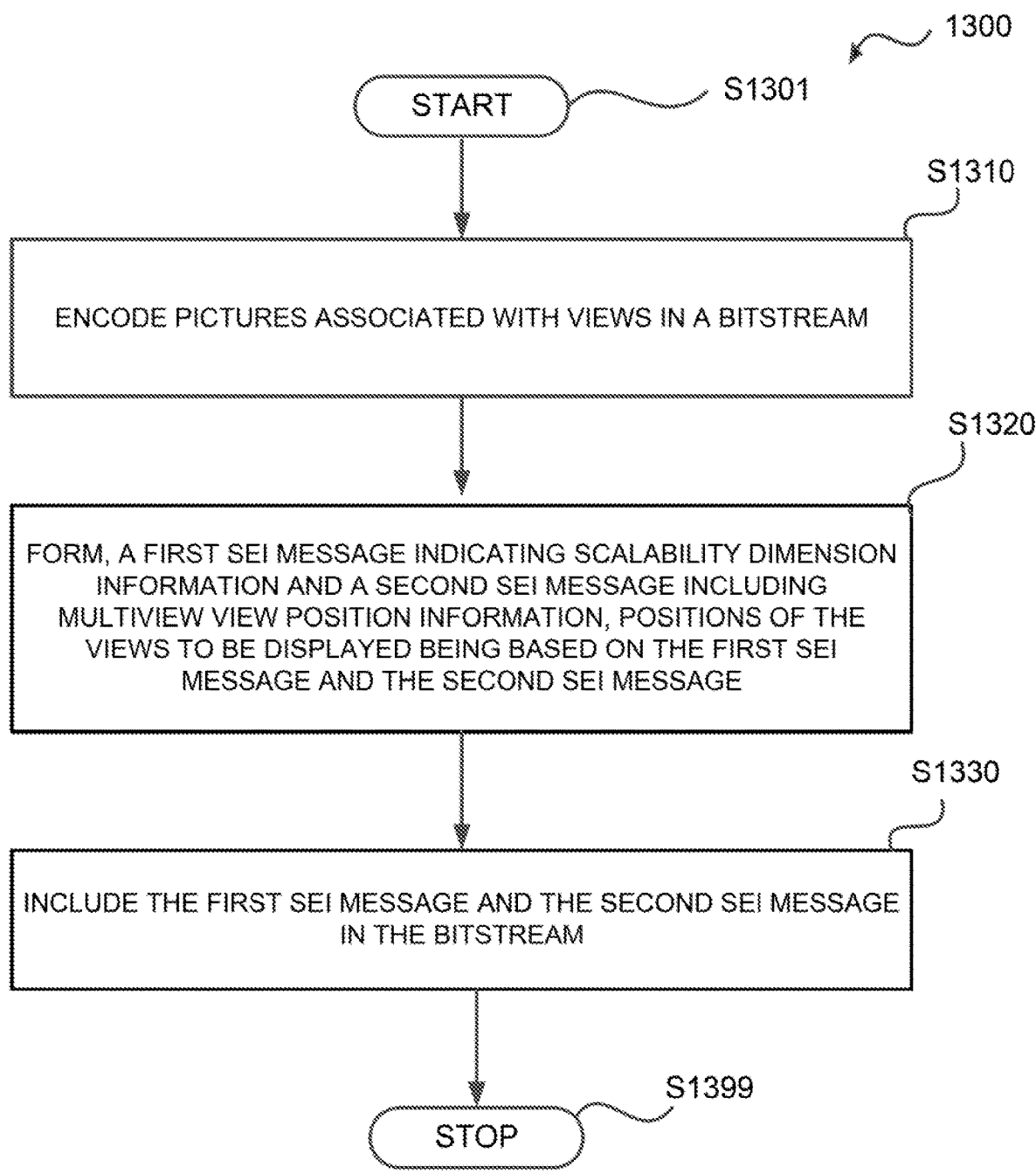
FIG. 13 shows a flow chart outlining an encoding process according to an embodiment of the disclosure.

FIG. 13 shows a flow chart outlining an encoding process (1300) according to an embodiment of the disclosure. In various embodiments, the process (1300) is executed by processing circuitry, such as the processing circuitry in the terminal devices (310), (320), (330) and (340), processing circuitry that performs functions of a video encoder (e.g., (403), (603), (703)), or the like. In some embodiments, the process (1300) is implemented in software instructions, thus when the processing circuitry executes the software instructions, the processing circuitry performs the process (1300). The process starts at (S1301), and proceeds to (S1310).

At (S1310), pictures associated with views (e.g., ViewId [0]-ViewId[3] in FIGS. 10A-C) in a bitstream can be encoded. In an example, the pictures associated with the views can be encoded with an encoding order. In an example, the pictures are included in an AU of a CVS and the pictures (and the views) are associated with a same capturing time instance or a display time instance.

At (S1320), a first supplemental enhancement information (SEI) message indicating scalability dimension information (SDI) and a second SEI message indicating multiview view position (MVP) information can be formed. In an example, the first SEI message is denoted as an SDI SEI message, and the second SEI message is denoted as an MVP SEI message, as described in the disclosure.

The first SEI message (e.g., the SDI SEI message) may indicate the number of views for the CVS. The first SEI message can specify a view ID of an i-th layer in the CVS where the value i is an integer. The value i can be larger than or equal to 0. In an example, the value i is an integer from 0 to num_views_minus1 as described with reference to FIG. 11. In an example, a syntax element sdi_view_id_val[i] specifies a value of the view ID (e.g., ViewID) of the i-th layer in the CVS. The view IDs of respective layers in the CVS can be referred to by the second SEI message (e.g., the MVP SEI message).

As described above, the coding order (e.g., the encoding order or a decoding order) can be different from a display order used to display the pictures associated with the views. The second SEI message can indicate the display order. In an example, the second SEI message indicates view positions (e.g., view_position[i]) of the views in one dimension (e.g., a horizontal axis) where the views can be specified by the ViewIds in the first SEI message, as described in the disclosure.

In an example, the second SEI message is associated with an IRAP AU of the CVS. In an example, the second SEI message is included in the CVS based on the first SEI message being included in the CVS.

At (S1330), the first SEI message and the second SEI message can be included in the bitstream. In an example, the first SEI message and the second SEI message are encoded and transmitted. The view IDs of the respective layers corresponding to the views in the CVS can be signaled. In an example, the layers correspond to the views, respectively. The view positions of the views in one dimension can be signaled.

The process (1300) proceeds to (S1399), and terminates.

The process (1300) can be suitably adapted to various scenarios and steps in the process (1300) can be adjusted accordingly. One or more of the steps in the process (1300) can be adapted, omitted, repeated, and/or combined. Any suitable order can be used to implement the process (1300). Additional step(s) can be added.

In an example, the CVS includes a third SEI message (e.g., a 3D reference displays information SEI message shown in FIG. 12) including 3D reference display information indicating a view identifier of a left view, a view identifier of a right view, and a reference display width of a reference display. The third SEI message can indicate a number of the views and a number of reference displays signaled in the third SEI message. A maximum value of the number of reference displays is based on the number of the views indicated in the third SEI message.

In an example, a first value (e.g., NumViews) indicating the number of the views is derived from the first SEI message. A third value associated with the number of the views from the third SEI message is obtained. The third value can be different from the first value. One (e.g., a value "1") plus the third value can be compared with the first value in a conformance check.

Figure 14:
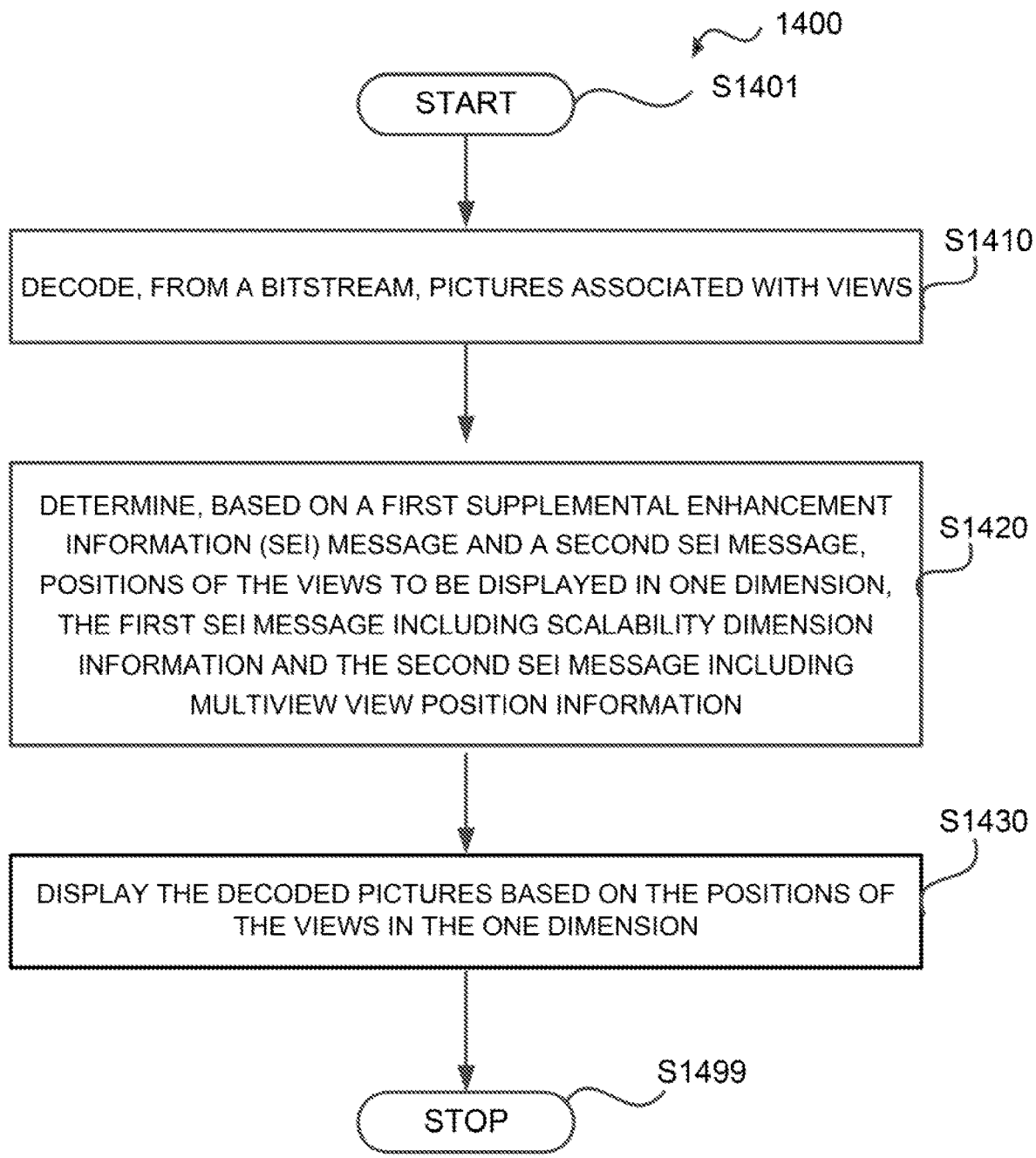
FIG. 14 shows a flow chart outlining a decoding process according to an embodiment of the disclosure.

FIG. 14 shows a flow chart outlining a decoding process (1400) according to an embodiment of the disclosure. In various embodiments, the process (1400) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1400) is implemented in software instructions, thus when the processing circuitry executes the software instructions, the processing circuitry performs the process (1400). The process starts at (S1401), and proceeds to (S1410).

At (S1410), pictures associated with views of respective layers in a coded video sequence (CVS) can be decoded from a bitstream. In an example, the pictures associated with the views can be decoded with a decoding order. In an example, the pictures are included in an AU of the CVS and the pictures (and the views) are associated with a same capturing time instance or a display time instance.

At (S1420), positions of the views to be displayed in one dimension (e.g., along a horizontal axis) can be determined based on a first supplemental enhancement information (SEI) message and a second SEI message. The first SEI message can include scalability dimension information (SDI). The second SEI message can include multiview view position (MVP) information.

In an example, the first SEI message includes an SDI SEI message and the second SEI message includes an MVP SEI message.

The first SEI message (e.g., the SDI SEI message) may indicate a number of the views for the CVS. The first SEI message can specify a view ID (e.g., ViewID[i]) of an i-th layer in the CVS where the value i is an integer. The value i can be larger than or equal to 0. In an example, the value i is an integer from 0 to num_views_minus1 as described with reference to FIG. 11. In an example, a syntax element sdi_view_id_val[i] in the first SEI message specifies a value of the view ID (e.g., ViewID) of the i-th layer in the CVS. The view IDs of respective layers in the CVS can be referred to by the second SEI message (e.g., the MVP SEI message).

The second SEI message (e.g., the MVP SEI message) can indicate positions (e.g., view_position[i]) of the views in one dimension where the views can be specified by the ViewIds in the first SEI message. In an example, the one dimension is a horizontal axis, and the positions of the views to be displayed are along the horizontal axis.

In an embodiment, for each of the views of the respective layers of the CVS, a view ID (e.g., ViewId[i]) of the respective view is determined based on the first SEI message. For example, the syntax element sdi_view_id_val[i] in the first SEI message specifies the value of the view ID (e.g., denoted as ViewID). The position of the respective view to be displayed in the one dimension (e.g., along the horizontal axis) can be determined based on a view position variable (e.g., view_position[i]) in the second SEI message and the determined view ID (e.g., ViewId[i]).

In an embodiment, the second SEI message is associated with an intra random access point (TRAP) AU of the CVS. In an example, the positions of the views are applied to AUs in the CVS.

At (S1410), the decoded pictures can be displayed based on the determined positions of the views in the one dimension (e.g., along the horizontal axis), such as described with reference to FIGS. 10A-10C.

The process (1400) proceeds to (S1499), and terminates.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added.

In an embodiment, whether the second SEI message is included in the CVS is based on whether the first SEI message is included in the CVS. The second SEI message may be present in the CVS when the first SEI message is present in the CVS.

When the CVS does not contain the first SEI message (e.g., the SDI SEI message), the CVS does not contain the second SEI message (e.g., the MVP SEI message). (S1420) is omitted when the first SEI message is not in the CVS. (S1430) can be adapted to display the decoded pictures based on the decoding order, a default order, or the like.

In an embodiment, a first value (e.g., NumViews) indicating a number of the views is derived from the first SEI message. A second value (e.g., num_views_minus1) associated with the number of the views can be obtained from the second SEI message. The second value can be different from the first value. A conformance check can be performed by comparing one plus the second value with the first value.

In an example, the CVS includes a third SEI message (e.g., a 3D reference displays information SEI message shown in FIG. 12) including 3D reference display information indicating a view distance and a view identifier of a left view, a view identifier of a right view, and a reference display width of a reference display. The third SEI message can indicate a number of the views and a number of reference displays signaled in the third SEI message. In an example, the first value (e.g., NumViews) indicating the number of the views is derived from the first SEI message. A third value (e.g., num_views_minus1) associated with the number of the views from the third SEI message is obtained. The third value can be different from the first value. One (e.g., a value "1") plus the third value can be compared with the first value in a conformance check. A maximum value of the number of reference displays is based on the third value associated with the number of the views in the third SEI message.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
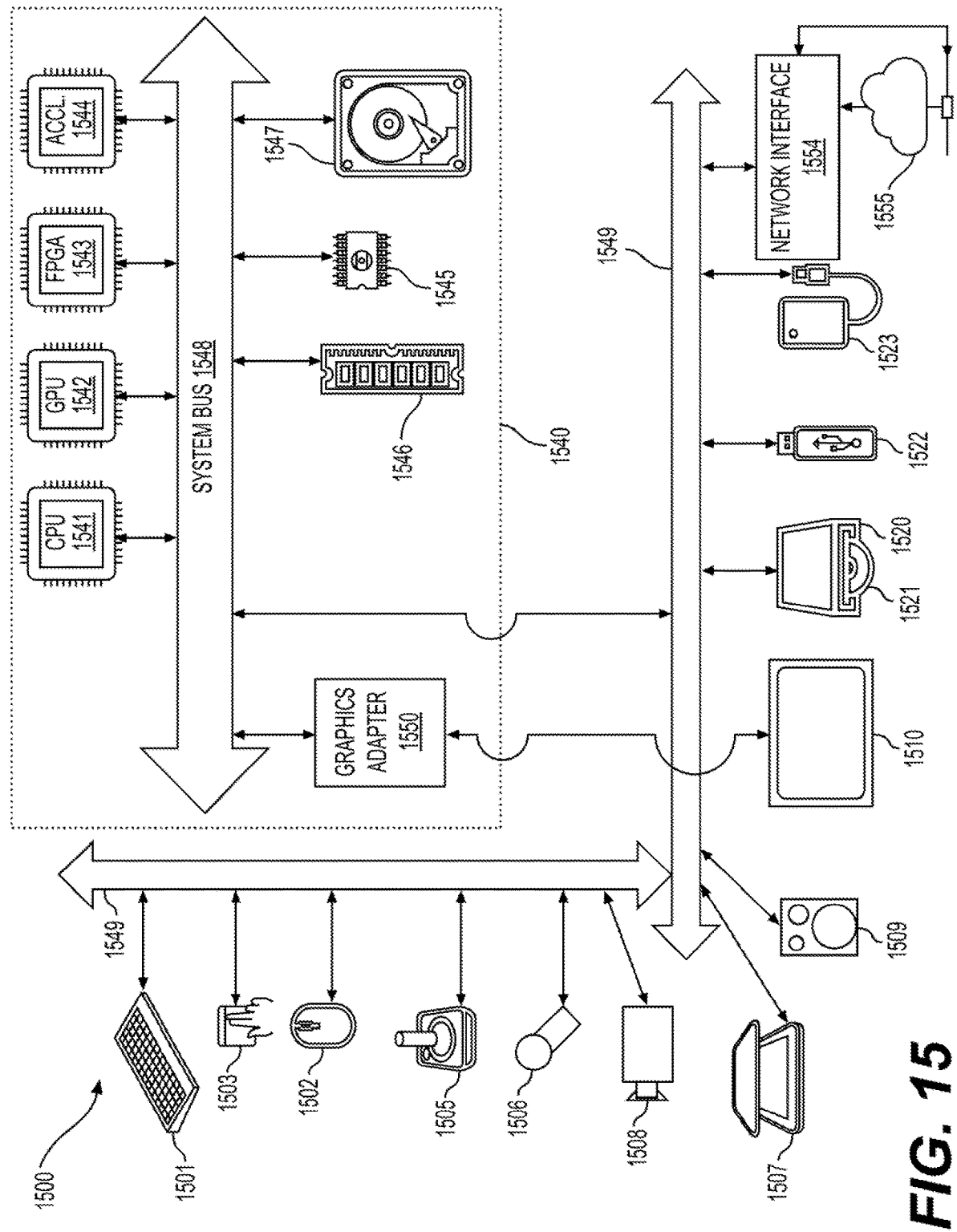
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch-screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
   decoding, from a bitstream, pictures associated with views of respective layers in a coded video sequence (CVS);
   determining, based on a first supplemental enhancement information (SEI) message and a second SEI message, positions of the views to be displayed in one dimension, the first SEI message including scalability dimension information (SDI) and the second SEI message including multiview view position (MVP) information; and
   displaying the decoded pictures based on the positions of the views in the one dimension,
   wherein the MVP information includes (i) number of views information that indicates a number of views that is derived from the SDI in the first SEI message and (ii) view position information that indicates an order of the views associated with view identifiers indicated by the SDI in the first SEI message.

2. The method of claim 1, wherein the determining comprises:
   for each of the views of the respective layers of the CVS,
   determining the view identifier of the respective view based on a first syntax element in the first SEI message; and
   determining the position of the respective view to be displayed in the one dimension based on a view position variable indicated by a second syntax element in the second SEI message and the determined view identifier.

3. The method of claim 1, further comprising:
   deriving a first value indicating the number of the views from the first SEI message;
   obtaining a second value associated with the number of the views from the second SEI message, the second value being different from the first value; and
   comparing one plus the second value with the first value in a conformance check.

4. The method of claim 1, wherein the second SEI message is associated with an intra random access point (IRAP) access unit of the CVS.

5. The method of claim 1, wherein the positions of the views are applied to access units in the CVS.

6. The method of claim 1, wherein
   the second SEI message is included in the CVS based on the first SEI message being included in the CVS, and
   the determining and the displaying are performed based on the first SEI message and the second SEI message being included in the CVS.

7. The method of claim 1, wherein the CVS includes a third SEI message including 3D reference display information, the 3D reference display information indicating a view identifier of a left view, a view identifier of a right view, and a reference display width of a reference display, and
   the method includes:
   deriving a first value indicating the number of the views from the first SEI message;
   obtaining a third value associated with the number of the views from the third SEI message, the third value being different from the first value; and
   comparing one plus the third value with the first value in a conformance check.

8. The method of claim 7, wherein
   the third SEI message indicates a number of reference displays signaled in the third SEI message, and
   a maximum value of the number of reference displays is based on the third value associated with the number of the views in the third SEI message.

9. The method of claim 1, wherein the first SEI message is an SDI SEI message and the second SEI message is an MVP SEI message.

10. A method for video encoding in a video encoder, comprising:
    encoding pictures associated with views of respective layers in a bitstream;
    generating a first supplemental enhancement information (SEI) message and a second SEI message based on positions of the views to be displayed in one dimension, the first SEI message including scalability dimension information (SDI) and the second SEI message including multiview view position (MVP) information; and encoding the first SEI message and the second SEI message in the bitstream, wherein the MVP information includes (i) number of views information that indicates a number of views that is derived from the SDI in the first SEI message and (ii) view position information that indicates an order of the views associated with view identifiers indicated by the SDI in the first SEI message.

11. The method of claim 10, wherein the second SEI message is associated with an intra random access point (IRAP) access unit of a coded video sequence.

12. The method of claim 10, wherein the positions of the views are applied to access units in a coded video sequence.

13. The method of claim 10, wherein the second SEI message is included in the bitstream based on the first SEI message being included in the bitstream.

14. The method of claim 10, generating a third SEI message including 3D reference display information, the 3D reference display information indicating a view identifier of a left view, a view identifier of a right view, and a reference display width of a reference display, and encoding the third SEI message in the bitstream.

15. The method of claim 14, wherein the third SEI message indicates a number of reference displays signaled in the third SEI message, and a maximum value of the number of reference displays is based on the third value associated with the number of the views in the third SEI message.

16. The method of claim 10, wherein the first SEI message is an SDI SEI message and the second SEI message is an MVP SEI message.

17. A method of processing visual media data, the method comprising:

processing a bitstream that includes the visual media data according to a format rule, wherein the bitstream includes a first supplemental enhancement information (SEI) message and a second SEI message, the first SEI message including scalability dimension information (SDI) and the second SEI message including multiview view position (MVP) information, the MVP information including (i) number of views information that indicates a number of views that is derived from the SDI in the first SEI message and (ii) view position information that indicates an order of the views associated with view identifiers indicated by the SDI in the first SEI message; and the format rule specifies that positions of views of respective layers associated with pictures to be displayed in one dimension are determined based on the first SEI message and the second SEI message, and the pictures are displayed based on the positions of the views in the one dimension.

18. The method of claim 17, wherein the format specifies that:

for each of the views of the respective layers of the bitstream, the view identifier of the respective view is determined based on a first syntax element in the first SEI message; and the position of the respective view to be displayed in the one dimension is determined based on a view position variable indicated by a second syntax element in the second SEI message and the determined view identifier.

19. The method of claim 17, wherein the format rule specifies that:

a first value indicating the number of the views is derived from the first SEI message;

a second value associated with the number of the views is obtained from the second SEI message, the second value being different from the first value; and one plus the second value is compared with the first value in a conformance check.

20. The method of claim 17, wherein the second SEI message is associated with an intra random access point (IRAP) access unit of the bitstream.

* * * * *